June 4, 1935.  J. H. HARDY  2,003,439
GAUGE
Original Filed Feb. 19, 1931
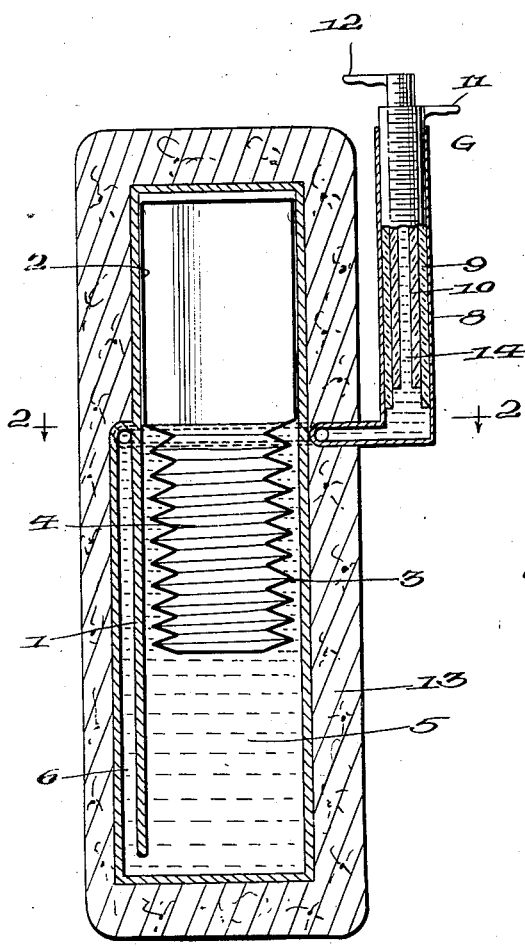
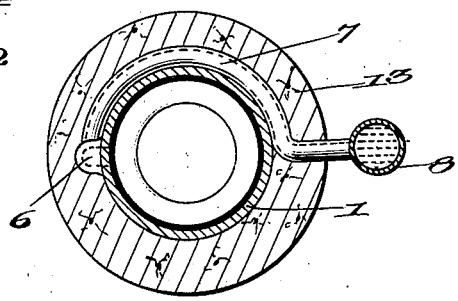
Inventor
James Harris Hardy
By Vernon C. Hodges
his Attorney Patented June 4, 1935

2,003,439

UNITED STATES PATENT OFFICE 2,003,439

GAUGE

James Harris Hardy, Columbus, Miss.

Application February 19, 1931, Serial No. 517,031
Renewed October 30, 1934

3 Claims. (Cl. 73—4)

This invention relates to improvements in gauges.

The invention consists of means utilizing a compressible air-chamber or bellows so constructed and arranged that it is compressed by the medium of gas or liquid, with visible means through, or by which, the weight or pressure is determined. The chamber or bellows is closed or sealed with a normally constant pressure, and its exterior only is acted on to cause an indication of the weight or pressure.

In the accompanying drawing:

Fig. 1 is a vertical sectional view through an altimeter embodying the invention; and Fig. 2 is a horizontal section through the same on line 2—2 of Fig. 1.

Referring to Fig. 1, the invention is shown as applied to an altimeter in which the numeral 1 indicates a casing, preferably of metal, and in the illustration it is cylindrical in form and it has adequate length for the purpose.

Within the chamber thus formed there is an air or gas chamber 2, which may be more or less fitted to the wall of the chamber, and the lower end is intended to be compressible, and to that end may be in the form of a bellows 3, thus forming a compressible chamber 4 within the larger chamber 5. The compressible chamber 4 formed by the bellows 3 together with the chamber 2 are sealed from external pressure and contain a normally constant pressure. The air or gas therein is, however, compressible when external pressure is applied to compress the bellows 3. The air chamber 2 acts as a storage chamber to give greater capacity to the bellows. The chamber 5 is preferably filled with a suitable liquid, although another fluid may be used if found suitable.

A tube 6 extends upwardly from the lower end of the chamber 5 beside the same, and, to better balance the weight of the gauge, its upper end 7 partially encircles the casing 1, as shown in Fig. 2; and these tubes 6 and 7 conduct liquid from the lower end of the chamber 5 into the lower end of the gauge-tube 8. Fitted telescopically within the tube 8 are the outer and inner tubes 9 and 10, respectively, which may be of glass, and these terminate in handles 11 and 12 at their upper ends by means of which they may be raised or lengthened out when the conditions of ascent require greater length for the column of liquid therein to rise, since its height in these tubes is sensitive to, and controlled by, the differential in pressure in chamber 4 and the outside atmosphere.

The tubes 9 and 10 are graduated, and these graduations are readable from the exterior of the tube 8, or through a slot which might be provided therein.

The entire chamber 1 might be enclosed in cork or other insulating material 13 as illustrated to prevent expansion of the liquid by variations in temperature.

The operation of an altimeter of this construction is readily understood since the level of liquid in the graduated gauge G at the top is determined by the air-pressure from the outside, entering through the open upper end of the gauge, pressing upon the liquid column 14, which acts against the compressible bellows 3.

As the air becomes more rare, the external pressure on the upper end of the column 14 decreases, and the excess pressure in the air-chamber 4 expands bellows 3, thus pressing on the liquid in chamber 5, forcing it upward through the pipes 6 and 7, and thence through the gauge G, raising the height of the liquid column 14 through the telescopic tubes 8 and 9, which latter may be slid up or down by hand according to the requirements of the altitude.

I claim:

1. In an altimeter, the combination with a liquid chamber and a compressible air-chamber therein, of a gauge in communication with the liquid chamber and the atmosphere, and including telescopic tubes adjustable with respect to one another to regulate the length of the gauge.

2. An altimeter comprising a casing, a smooth cylindrical air chamber therein terminating in a communicating bellows at an end thereof, and a fluid chamber enclosing a fluid acting on said bellows, said bellows being disposed in the top of said fluid chamber and in contact with the upper portion of the fluid in said chamber.

3. An altimeter comprising a casing, a smooth cylindrical air chamber therein terminating in a communicating bellows at an end thereof, a fluid chamber enclosing a fluid acting on said bellows, an indicating tube communicating with said fluid chamber and extending upwardly therefrom, and an enclosure of insulating material for the casing.

JAMES HARRIS HARDY.